United States Patent [19]
Fukuda

[11] Patent Number: 6,104,458
[45] Date of Patent: Aug. 15, 2000

[54] LIQUID CRYSTAL MODULATION ELEMENT AND PROJECTION-TYPE LIQUID CRYSTAL DISPLAY APPARATUS HAVING INTERCEPTING FILTERS AND MICROLENSES

[75] Inventor: Toshihiro Fukuda, Kanagawa, Japan

[73] Assignee: Sony Corporation, Tokyo, Japan

[21] Appl. No.: 09/178,891

[22] Filed: Oct. 27, 1998

[30] Foreign Application Priority Data

Oct. 28, 1997 [JP] Japan ................................ 9-295939

[51] Int. Cl.⁷ ................................ G02F 1/1335
[52] U.S. Cl. ................................ 349/95; 349/106
[58] Field of Search ................................ 349/106, 105, 349/95, 104, 8

[56] References Cited

U.S. PATENT DOCUMENTS

| | | | |
|---|---|---|---|
| 5,161,042 | 11/1992 | Hamada | 359/41 |
| 5,546,206 | 8/1996 | Nakanishi et al. | 359/67 |
| 5,566,007 | 10/1996 | Ikeda et al. | 359/40 |
| 5,623,349 | 4/1997 | Clarke | 349/95 |
| 5,777,804 | 7/1998 | Nakamura et al. | 359/727 |
| 5,798,805 | 8/1998 | Ooi et al. | 349/10 |

FOREIGN PATENT DOCUMENTS 4-60538  2/1992  Japan .

*Primary Examiner*—Walter Malinowski
*Attorney, Agent, or Firm*—Ronald P. Kananen; Rader, Fishman & Grauer

[57] ABSTRACT

A liquid crystal modulation element and a projection-type liquid crystal display apparatus are provided for maintaining color purity and improving luminance of an image. Microlenses each provided for every three pixel electrodes condense color rays of B, R and G incident at mutually different angles and have the rays enter the pixels of the respective colors. Trimming filters are each provided on the respective pixel electrodes for intercepting rays leaking onto the own pixel electrode of the color rays to enter the neighboring pixel electrodes. As a result, a reduction in color purity due to color mixture is prevented even if the incident divergence angles of the color rays entering a liquid crystal panel are large. Since the incident divergence angles may be relatively large, the amount of diaphragming in the optical projection system may be reduced. A large quantity of light is thereby obtained.

6 Claims, 8 Drawing Sheets

LIQUID CRYSTAL MODULATION ELEMENT AND PROJECTION-TYPE LIQUID CRYSTAL DISPLAY APPARATUS HAVING INTERCEPTING FILTERS AND MICROLENSES

BACKGROUND OF THE INVENTION

1. Field of the Invention

The present invention relates to a liquid crystal modulation element capable of modulating light passing through a liquid crystal layer pixel by pixel and to a projection-type liquid crystal display apparatus for displaying an image through modulating light emitted from an optical projection system by a liquid crystal modulation element and enlarging and projecting the light onto a screen. The invention particularly relates to a liquid crystal modulation element that achieves color display with the single element and a projection-type liquid crystal display apparatus comprising such a single liquid crystal modulation element.

2. Description of the Related Art

Projection-type liquid crystal apparatuses such as liquid crystal projectors and liquid crystal projection television sets have been developed for enlarging and projecting an image on a liquid crystal panel onto a screen by means of an optical projection system through the use of the liquid crystal panel as an optical switching element or an optical modulation element. Such liquid crystal display apparatuses include a triple-panel apparatus comprising monochrome liquid crystal panels each provided in optical paths of blue (B), red (R) and green (G), respectively, and a single-panel apparatus comprising a liquid crystal panel having three color filters (CF) for selecting colors of B, R and G for every pixel. Since the triple-panel apparatus is large in size and less attractive in terms of costs, the single-panel apparatus with a simple configuration is often adopted where reductions in size, weight and cost are highly required.

The single-panel liquid crystal panel with color filters as described above has an advantage in that an image with excellent color purity is obtained. However, the color filters absorb much light and the light resistance is low. For example, the temperature of the filter for selecting a G color ray provided in correspondence with a pixel for G rises with the filter absorbing R and B color rays. The filter characteristics are thereby significantly reduced. Cooling to a sufficient degree is therefore required. The same applies to the R and B filters provided in correspondence with pixels for R and B. Furthermore, each color filter performs color separation through intercepting other color rays transmitted therethrough by absorption. Consequently, the efficiency of utilizing light from the light source is low and the light transmissivity of the liquid crystal panel as a whole is low. It is therefore difficult to efficiently perform cooling of the apparatus and to achieve high luminance with such a single-panel apparatus with color filters.

In order to overcome these problems, single-panel color liquid crystal display apparatuses are disclosed in, for example, Japanese Patent Application Laid-open No. 4-60538 (1992) that corresponds to U.S. Pat. No. 5,161,042 and 'Asia Display '95 (p. 887)' wherein one condenser microlens is opposed to every three pixels. Three color rays of B, R and G are entered to each microlens from mutually different directions and condensed. The light sent out from the microlens is entered to each of the three pixels corresponding to three colors of B, R and G, respectively. Since such a projection-type liquid crystal display apparatus comprises a single liquid crystal panel with a microlens array instead of a color filter, the apparatus of this type will be called a projection-type liquid crystal display apparatus of the color-filterless single-panel microlens system. Since the apparatus does not comprise any color filter that would absorb a substantial portion of incident light, the apparatus exhibits an excellent light resistance and the liquid crystal panel as a whole achieves a high efficiency of utilizing light. Furthermore, the microlens allows light incident on regions between pixels (black matrix regions) to be effectively utilized as well. The substantial aperture ratio (the ratio of effective pixel area to the whole pixel area) is thereby increased and the efficiency of utilizing light is further enhanced. High illuminance of an image displayed is achieved, accordingly.

FIG. 1 is an enlarged cross section of a liquid crystal panel of a projection-type liquid crystal display apparatus of the color-filterless single-panel microlens system as disclosed in the above-mentioned publications and so on. The liquid crystal panel comprises: a pixel substrate 181 where a number of pixel electrodes are formed; a counter substrate 182 where counter electrodes and microlenses are formed; and a liquid crystal layer 183 placed between the pixel electrode 181 and the counter substrate 182.

The pixel substrate 181 includes: a glass substrate 1811; pixel electrodes 1812B, 1812R, 1812G and so on for B, R and G color rays, regularly (periodically) arranged on one side (on which light is incident) of the glass substrate 1811; and a black matrix section 1813 including thin film transistors (TFTs) (not shown) functioning as switching devices for applying voltage based on image signals to the pixel electrodes. The black matrix section 1813 is shielded from light with a metal film of aluminum and so on (not shown) so as to prevent the TFTs from wrongly operating.

The counter substrate 182 includes: a glass substrate 1821; a microlens array made up of condenser microlenses 1822 formed on one side (from which light goes out) of the glass substrate 1821; a cover glass 1823 placed in intimate contact with the microlenses 1822; and a counter electrode 1824 formed on the cover glass 1823. One of the microlenses 1822 is provided for every three pixel electrodes 1812B, 1812R and 1812G of the pixel electrode 181. The counter electrode 1824 is a transparent electrode formed all over the surface of the cover glass 1823 or in a required region of the surface of the cover glass 1823 (that is, at least in a region opposite the pixel electrodes 1812B, 1812R and 1812G of the pixel substrate 181). The counter electrode 1824 is maintained at a fixed potential.

The general operation of the liquid crystal panel shown in FIG. 1 will now be briefly described. The microlens 1822 condenses the ray bundles of B, R and G separated by dichroic mirrors not shown and entering from three different directions and have the ray bundles enter the pixel electrodes 1812B, 1812R and 1812G through the liquid crystal layer 183. The liquid crystal molecular orientation changes in the region of the liquid crystal layer corresponding to each pixel, depending on color image signals applied to the pixel electrodes of the pixel substrate 181. The three color rays of B, R and G incident on each region of the liquid crystal layer are selectively spatially modulated. The color rays thus modulated in the liquid crystal panel from an image by means of a projection lens not shown on a screen (not shown) and colors are synthesized. A color image is thus displayed on the screen.

Data projectors and rear projector televisions embodied through liquid crystal projection have been practically utilized. As the multimedia technology moves forward, the demand for apparatuses is expected that display a combination of a computer image and an audiovisual (AV) image with high definition as a high definition television. For such apparatuses, an optical system including a liquid crystal element that achieves higher definition, image quality and luminance is required, compared to conventional apparatuses. Consequently, it is required to reduce pixel areas.

With a reduction in pixel area, the diameter of a ray bundle condensed by a microlens is required to be reduced, accordingly. It is ideal that color ray bundles entering the microlens from the optical projection system in a preceding stage are completely telecentric ray bundles. However, actual incident color ray bundles include rays slightly shifted from the principal ray. As a result, color rays to enter one pixel only may be incident onto a black matrix section bordering on a neighboring pixel. The efficiency of condensing light is thereby decreased. Consequently, the luminance of a displayed image is decreased and the effect of the microlens is reduced. Furthermore, if the angle of shift from the principal ray mentioned above (the angle will be called incident divergence angle in the following description) is large, a color ray to enter a pixel for a specific color (a pixel for G, for example) may leak onto a neighboring pixel for another color (a pixel for R, for example). A phenomenon called color mixture thus occurs and color purity is reduced. Therefore, the luminance of a displayed image and color mixture are sensitively affected by the degree of incident divergence angle.

FIG. 2 shows color purity degradation due to color mixture, using the x-y chromaticity diagram of the XYZ color system of Commission Internationale de l'Eclairage (CIE). In the chart, coordinate points each indicated with a circle represent color rays of B, R and G without color mixture. Coordinate points each indicated with a square represent color rays into which another color ray is mixed by 1 percent. Coordinate points each indicated with a delta represent color rays into which another color ray is mixed by 2 percent. As shown, color mixture of a miniscule 1 to 2 percent results in a reduction in purity of color rays. In particular, the purity of R ray is significantly reduced.

As thus described, in the projection-type liquid crystal display apparatus of the color-filterless single-panel microlens system, if the incident divergence angle of a ray illuminating the liquid crystal panel is large, color mixture results and color purity of a displayed image is decreased and the image quality may be significantly reduced. It is therefore required to reduce the incident divergence angle of light incident on the liquid crystal panel to a sufficiently small degree. On the other hand, in order to reduce the incident divergence angle, it is required to sufficiently reduce the aperture provided in the optical projection system from the light source to the liquid crystal panel. As a result, the quantity of light reaching the liquid crystal panel is inevitably reduced and it is difficult to obtain a sufficient luminance of an image. That is, in such a projection-type liquid crystal display apparatus, there is a trade-off between improvements in color purity and luminance and it is difficult to achieve both at the same time.

SUMMARY OF THE INVENTION

It is an object of the invention to provide a liquid crystal modulation element and a projection-type liquid crystal display apparatus for maintaining color purity and improving luminance of an image.

A liquid crystal modulation element of the invention comprises: a liquid crystal layer including a liquid crystal material; pixels arranged in correspondence with a plurality of primary colors for selectively modulating rays passing through the liquid crystal layer; condensing means each provided for every group of the pixels and condensing color rays of the primary colors incident at angles different from one another and having the color rays enter the pixels of the corresponding colors; and intercepting filters formed on sides of the pixels on which the rays are incident for intercepting rays leaking thereto of the color rays to enter the neighboring pixels.

A projection-type liquid crystal display apparatus of the invention comprises: a color separation means for separating incident light into rays of a plurality of primary colors and sending out the color rays at angles different from one another; a single liquid crystal modulation element; and a means for combining the color rays sent out from the liquid crystal modulation element and forming an image. The single liquid crystal modulation element includes: a liquid crystal layer including a liquid crystal material; pixels arranged in correspondence with the primary colors for selectively modulating rays passing through the liquid crystal layer; condensing means each provided for every group of the pixels and condensing color rays of the primary colors incident from the color separation means at angles different from one another and having the color rays enter the pixels of the corresponding colors; and intercepting filters formed on sides of the pixels on which the rays are incident for intercepting color rays leaking onto one of the pixels and that are meant to enter the neighboring pixels.

According to the liquid crystal modulation element and the projection-type liquid crystal display apparatus of the invention, the rays of the primary colors incident at the angles different from one another are condensed by the condensing means and enter the pixels of the corresponding colors. The rays leaking into the specific pixel of the color rays to enter the neighboring pixels are intercepted by the filters formed on the sides of the pixels on which the rays are incident. Color mixture is thereby suppressed.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

[First Embodiment]

Figure 1:
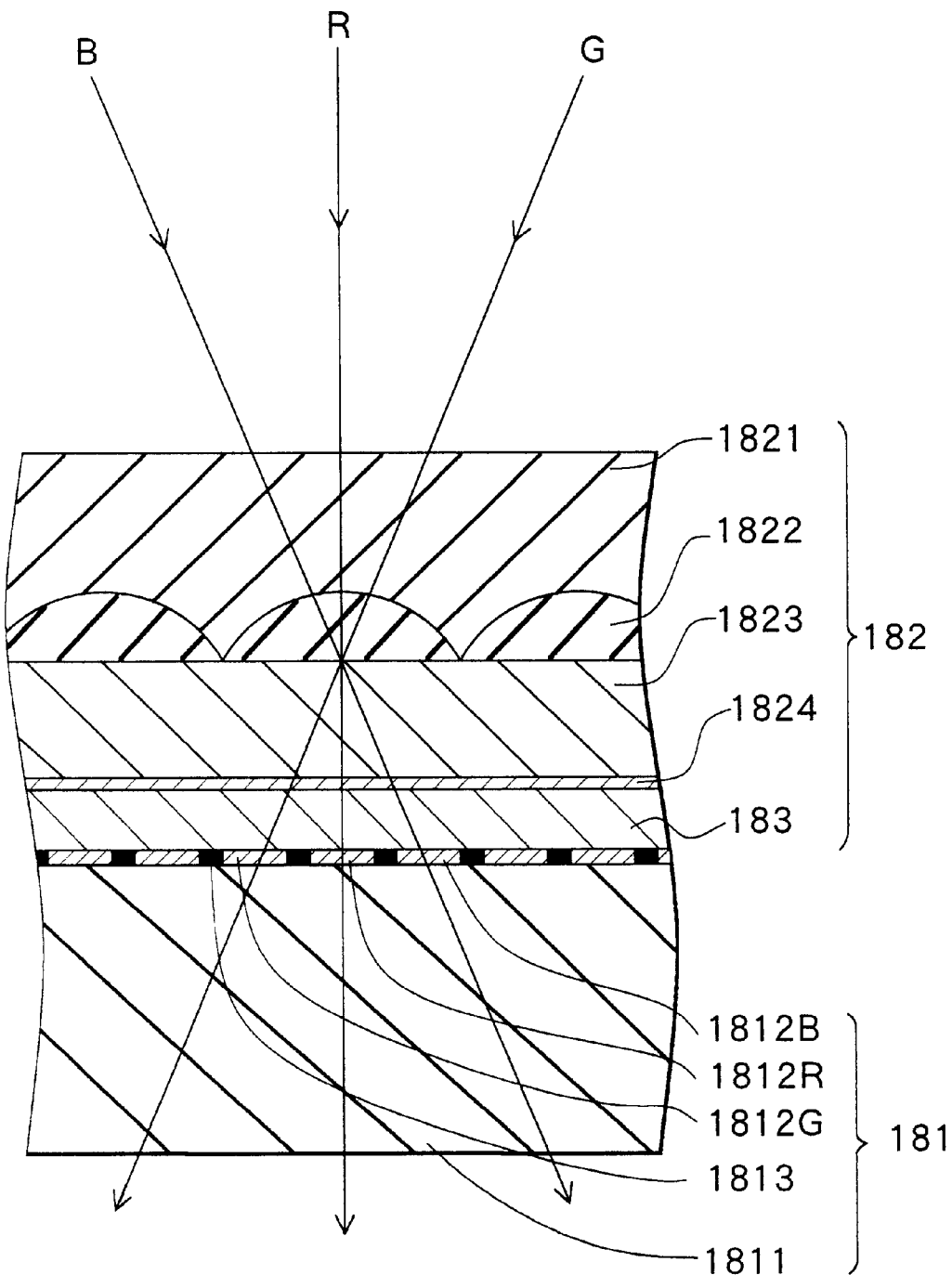
FIG. 1 is an enlarged cross section of a liquid crystal panel of a projection-type liquid crystal display apparatus of the color-filterless single-panel microlens system of related art.
Figure 2:
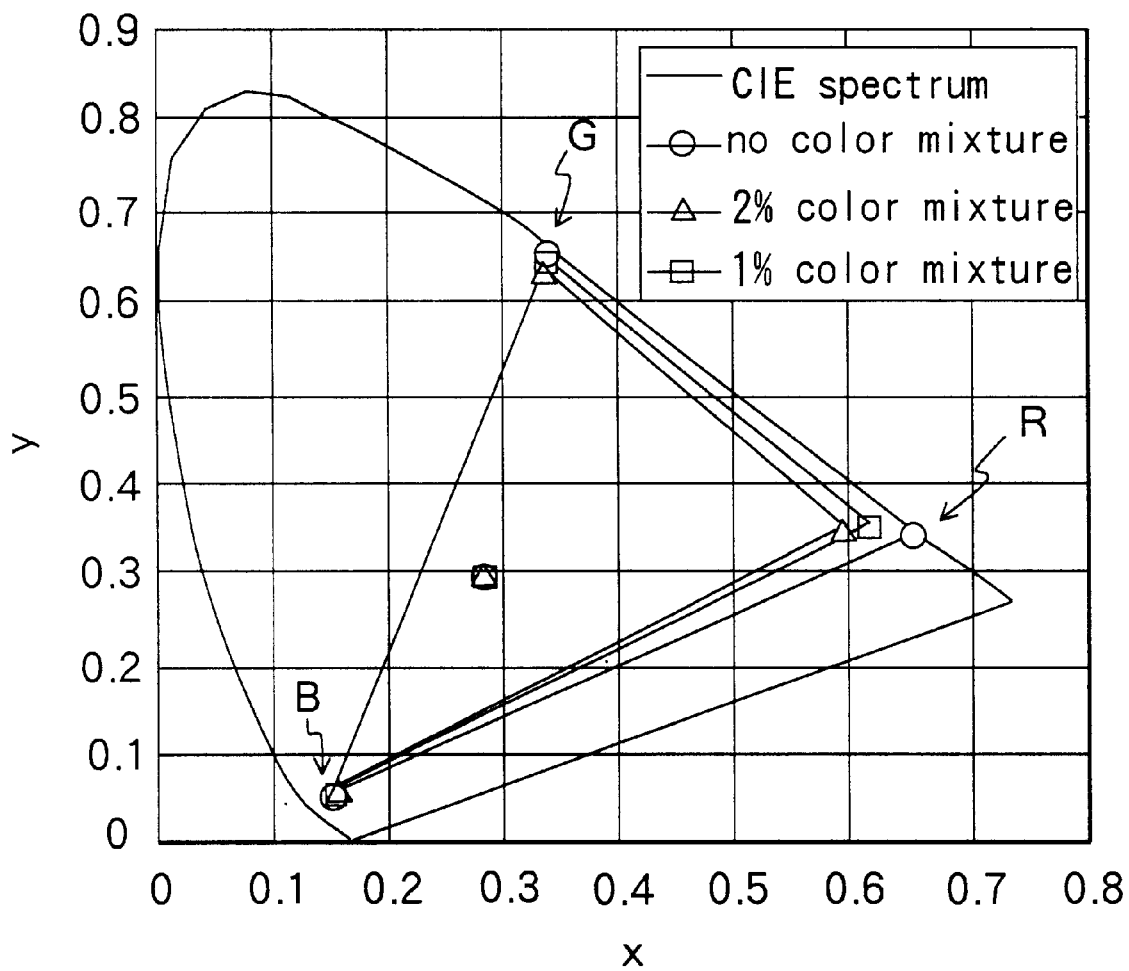
FIG. 2 is a plot for showing color purity degradation due to color mixture.
Figure 3:
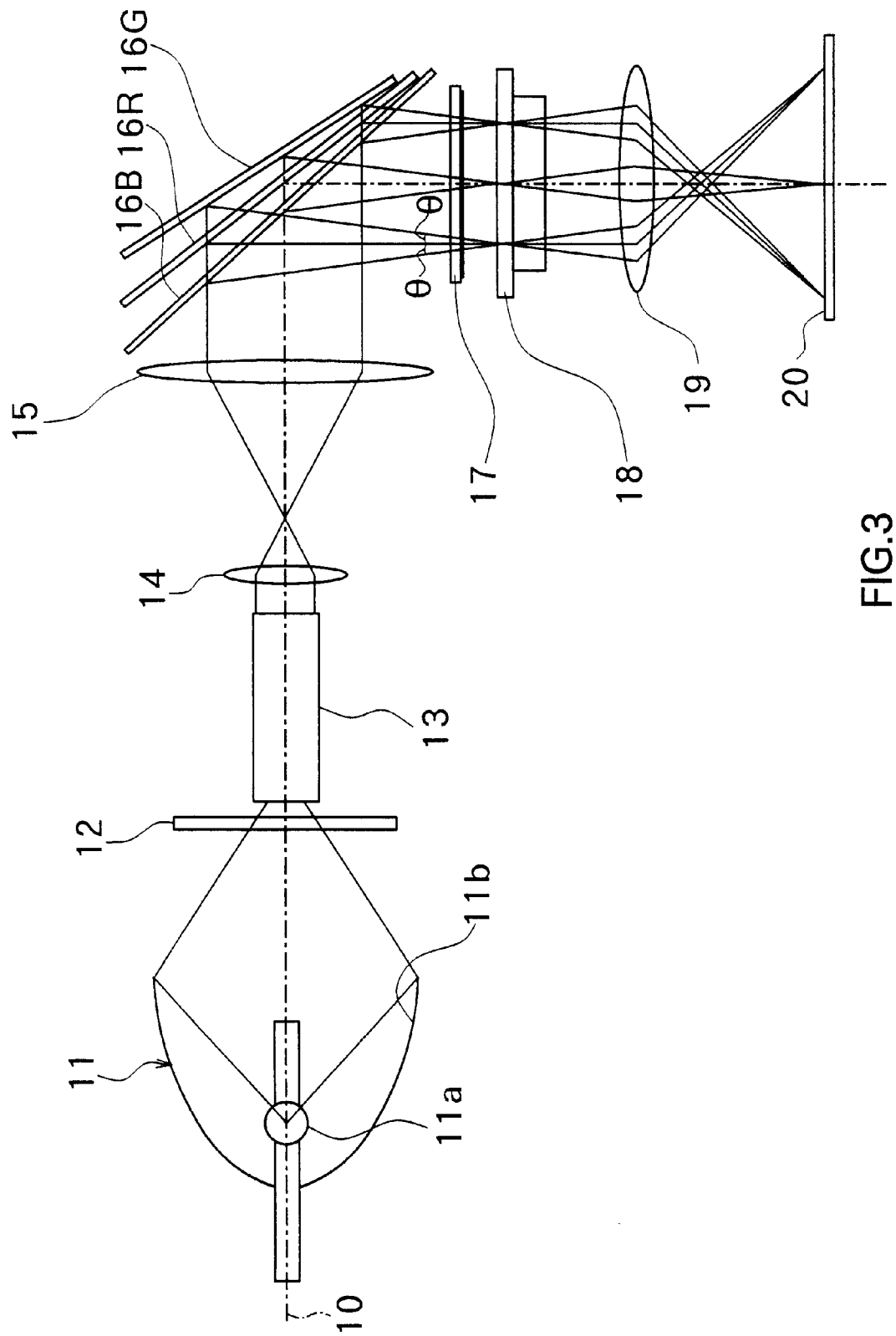
FIG. 3 is a top view of a main part of a projection-type liquid crystal display apparatus of an embodiment of the invention.

FIG. 3 is a schematic view of an optical system of a projection-type liquid crystal display apparatus of a first embodiment of the invention, seen from overhead. For simplicity, only main light paths are shown while the other paths are omitted. The apparatus is of the color-filterless single-panel microlens system and comprises: a light source 11 for emitting white light; a UV-IR cut filter 12 for removing ultraviolet and infrared rays from the white light emitted from the light source 11; a glass rod integrator 13 for unifying the intensity distribution in a cross section of a bundle of rays passing through the UV-IR cut filter 12; a relay lens 14 for condensing the ray bundle sent out from the glass rod integrator 13; and a collimator lens 15 for transforming the ray bundle sent out from the relay lens 14 into a nearly parallel ray bundle.

The display apparatus further comprises: dichroic mirrors 16B, 16R and 16G placed in the optical path behind the collimator lens 15 for separating the white ray bundle sent out from the collimator lens 15 into color rays of B, R and G and reflecting the color rays at angles different from one another; an incident polarizing plate 17 for passing only components linearly polarized in a specific direction of the color rays of B, R and G separated by the dichroic mirrors 16B, 16R and 16G; a liquid crystal panel 18 for modulating the color rays passing through the polarizing plate 17 based on color image signals; and a projection lens 19 for condensing the rays sent out from the liquid crystal panel 18 and projecting the rays onto a screen 20 and synthesizing the colors. An outgoing polarizing plate placed behind the liquid crystal panel 18 is not shown. The liquid crystal panel 18 corresponds to a 'liquid crystal modulation element' of the invention. The dichroic mirrors 16B, 16R and 16G correspond to 'color separation means' of the invention. The projection lens 19 corresponds to a 'means for combining' of the invention.

The light source 11 is made up of an emitter 11a and a concave mirror 11b of rotation symmetry. A metal-halide lamp may be used as the emitter 11a. A mirror with excellent condensing efficiency is preferred as the concave mirror 11b such as a spheroid mirror. The glass rod integrator 13 is made of glass in the shape of prism and unifies the intensity distribution in a cross section of the ray bundle incident from one end face of the integrator by reflecting the ray bundle inside a number of times and emits the ray bundle from the other end face. The illuminance distribution in the surface of the liquid crystal panel 18 is thereby made even. Instead of the glass rod integrator 13, an integrator made up of a pair of multilens arrays (fly's eye lenses) may be used.

The dichroic mirrors 16B, 16R and 16G, placed at a small angle from each other, each selectively reflect a ray bundle sent out from the collimator lens 15 and nearly parallel to an optical axis 10 at about 90 degrees and separate the ray bundle into three color rays of B, R and G. The dichroic mirrors 16B, 16R and 16G then enter the three color rays into the liquid crystal panel 18 at mutually different angles. In the example shown, the dichroic mirrors 16B, 16R and 16G are arranged such that the R ray is orthogonally incident on the liquid crystal panel 18 and the B ray and the G ray are each incident on the liquid crystal panel 18 at an angle of [+θ] and [−θ], respectively, from the R ray. Alternatively, the arrangement may be such that the B ray (or the G ray) is orthogonally incident on the liquid crystal panel 18 and the R ray and the G ray (or the R ray and the B ray) are each incident at an angle of [+θ] and [−θ], respectively, from the normal.

Basically, the liquid crystal panel 18 is a panel of the color-filterless microlens system, including pixel electrodes (not shown in FIG. 3) regularly arranged in two dimensions in correspondence with the colors of R, G and B, and condenser microlenses (not shown in FIG. 3) each of which is opposed to every three pixel electrodes of R, G and B with a liquid crystal layer (not shown) in between. The condenser microlenses each condense rays of three colors B, R and G separated by the dichroic mirrors 16B, 16R and 16G and entering at mutually different angles. The condenser microlenses then have the rays each enter the respective pixels corresponding to the three colors of B, R and G. The liquid crystal panel 18 will be described later on.

With respect to the optical elements shown in FIG. 3, the direction orthogonal to the optical axis 10 on the drawing sheet is called horizontal direction and the direction orthogonal to the sheet is called vertical direction. This definition applies to the following description as well.

Figure 4:
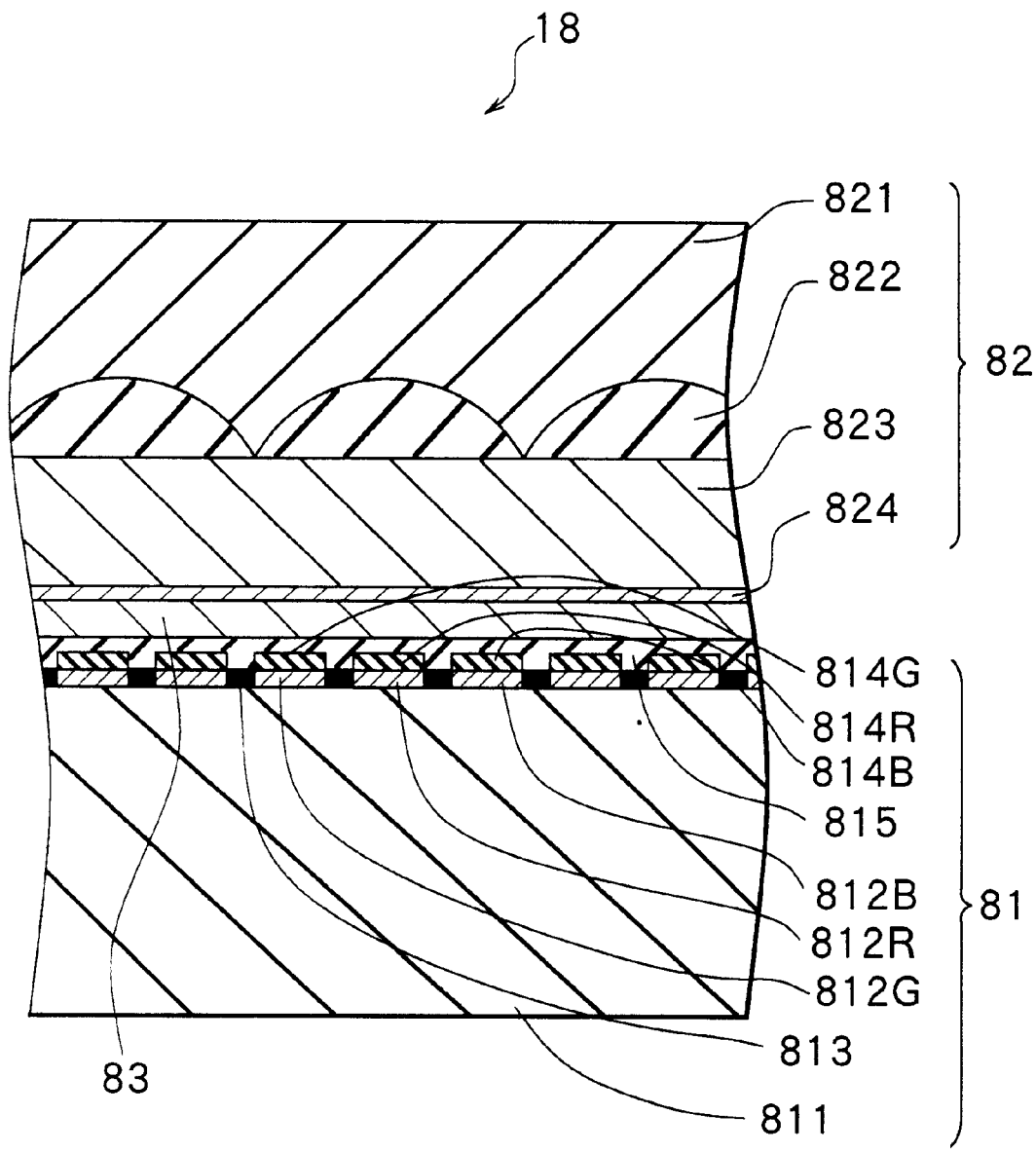
FIG. 4 is an enlarged cross section of the main part of the liquid crystal panel shown in FIG. 3.

FIG. 4 is an enlarged cross section of the liquid crystal panel 18 shown in FIG. 3 taken along the horizontal direction. As shown, the liquid crystal panel 18 includes: a pixel substrate 81 where a number of pixel electrodes and so on are formed; a counter substrate 82 where counter electrodes and microlenses are formed; and a liquid crystal layer 83 made of liquid crystal material placed between the pixel electrode 81 and the counter substrate 82. The liquid crystal layer 83 corresponds to a 'liquid crystal layer' of the invention.

The pixel substrate 81 includes: a glass substrate 811; pixel electrodes 812B, 812R, 812G and so on for B, R and G color rays, regularly (periodically) arranged on one side (on which light is incident) of the glass substrate 811; and a black matrix section 813 including TFTs (not shown) functioning as switching devices for applying voltage based on image signals to the pixel electrodes. The TFTs each include a gate electrode, a drain electrode and a source electrode (not shown) made of poly-silicon, for example. The gate electrode is connected to an address line (not shown) extending from right to left of the drawing sheet. The source electrode is connected to a data line (not shown) for B, R or G extending in the direction orthogonal to the sheet. The drain electrode is connected to the pixel electrode 812B, 812R or 812G. By applying an image signal voltage of B, R or G to the pixel electrode where the address line and the data line intersect, the liquid crystal molecular orientation is changed in the liquid crystal layer 83 between the pixel electrode and the counter electrode 824 described below. The polarization direction of light passing therethrough is thus controlled. The black matrix section 813 is shielded from light with a metal film of aluminum and so on (not shown) so as to prevent the TFTs from wrongly operating. The pixel electrodes 812B, 812R and 812G and so on correspond to 'pixels' of the invention.

The pixel substrate 81 further includes trimming filters 814B, 814R and 814G and so on each formed on the pixel electrodes 812B, 812R and 812G and so on so as to correspond to the respective pixel electrodes. The trimming filter 814B transmits only B color rays of color rays entering the pixel electrode 812B and intercepts other color rays (G and R color rays). The trimming filter 814R transmits only R color rays of color rays entering the pixel electrode 812R and intercepts other color rays (B and G color rays). The trimming filter 814G transmits only G color rays of color rays entering the pixel electrode 812G and intercepts other color rays (B and R color rays). The trimming filters 814B, 814R and 814G are made of a dye, such as an acrylic resin of dispersed pigment type, as a base material, for example. The trimming filters 814B, 814R and 814G are covered with a protection layer 815 whose surface is flattened. The protection layer 815 is made of an insulating material such as an acrylic resin, for example. An alignment layer (not shown) is further formed on the protection layer 815. The trimming filters 814B, 814R and 814G and so on correspond to 'intercepting filters' of the invention.

The counter substrate 82 includes: a glass substrate 821; a microlens array made up of condenser microlenses 822 formed on one side (from which light goes out) of the glass substrate 821; a cover glass 823 placed in intimate contact with the microlenses 822; a counter electrode 824 formed on the cover glass 823; and an alignment layer (not shown) formed on the counter electrode 824. The counter electrode 824 is a transparent common electrode formed all over the surface of the cover glass 823 or in a required region of the surface of the cover glass 823 (that is, at least in a region opposed to the pixel electrodes 812B, 812R and 812G of the pixel substrate 81). The counter electrode 824 is maintained at a fixed potential. The microlenses 822 are formed as gradient index lenses through a method of etching a substrate into the shape of lenses and implanting a transparent resin therein or through selective ion diffusion, for example. The microlenses 822 may be formed through any other method. The microlenses 822 are typically semicylindrical lenses each having an axis orthogonal to the drawing sheet. Alternatively, the microlenses 82b may be formed in the shape of typical spheres, in the shape of nearly spherical curved surface or in the shape of aspherical surface. The microlenses 822 are placed in accordance with a delta (triangle) arrangement, for example. Alternatively, the microlenses 822 may be placed in any other arrangement such as a stripe or a mosaic arrangement. The microlenses 822 correspond to 'condensing means' of the invention.

Figure 5:
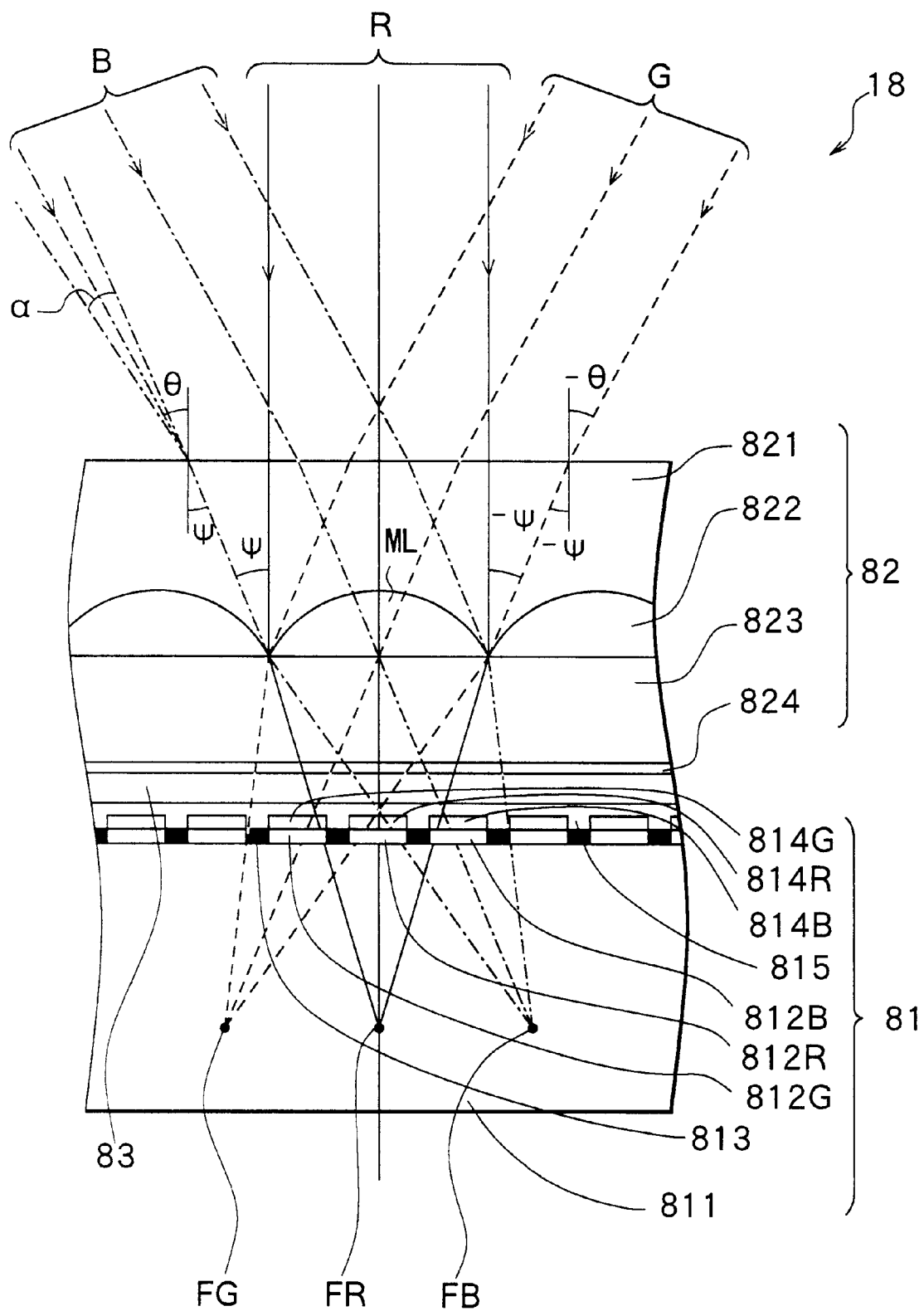
FIG. 5 is an explanatory view for illustrating the function of the liquid crystal panel.

Referring to FIG. 3 and FIG. 5, the operation and functions of the projection-type liquid crystal display apparatus with such a configuration will now be described. FIG. 5 illustrates optical paths of color rays of R, B and G entering the liquid crystal panel 18. The solid line indicates the R color ray, the alternate short and long dash line indicates the B color ray and the broken line indicates the G color ray.

Referring to the optical system shown in FIG. 3, the operation of the apparatus as a whole will now be described. As shown, white light is emitted from the light source 11 and ultraviolet and infrared rays are removed from the white light by the UV-IR cut filter 12. The light converges and then enters the glass rod integrator 13. The intensity distribution in a cross section of the ray bundle incident on the glass rod integrator 13 is made even by reflecting the ray bundle inside the integrator a number of times and the ray bundle enters the relay lens 14. The ray bundle is converged by the relay lens 14 and then enters the collimator lens 15. The ray bundle is transformed into a nearly telecentric ray bundle by the collimator lens 15 and sent out.

The nearly telecentric ray bundles enter the dichroic mirrors 16B, 16R and 16G. The dichroic mirrors 16B, 16R and 16G separate the incident ray bundles into the three colors of B, R and G and reflect the color rays in the directions different from one another. The reflected rays then enter the incident polarizing plate 17. The polarizing plate 17 transmits only linearly polarized components in a specific polarization direction of the incident color rays. The sufficiently linearly polarized color rays transmitted through the polarizing plate 17 then enter the liquid crystal panel 18 from the directions different from one another. The liquid crystal panel 18 modulate the color rays of B, R and G based on color image signals and sends out the rays.

Immediately behind the polarizing plate 17, a phase plate for rotating the polarizing direction by 45 degrees may be added. In this case, the polarizing direction of light incident on the liquid crystal panel 18 forms an angle of about 45 degrees with respect to the plane including the color rays of B, R and G reflected by the dichroic mirrors 16B, 16R and 16G and incident on the liquid crystal panel 18 (that is, the horizontal plane orthogonal to the liquid crystal panel 18). Inconsistencies in color in the horizontal direction of an image are thereby reduced.

Reference is now made to FIG. 5 for describing the path of light incident on microlens ML, one of the microlenses 822. The R color rays orthogonally enters the glass substrate 821 of the counter substrate 82 and pass through the pixel electrode 812R through which the optical axis of microlens ML passes. The R color rays then converge at a deep point in the glass substrate 811 beneath the pixel electrode 812R. Part of the R color rays enters part of the black matrix section 813 and part of the neighboring pixel electrodes 812B and 812G. The B color rays enter the glass substrate 821 at incident angle θ and are refracted at refraction angle φ. The B color rays then enter microlens ML at incident angle φ and pass through the pixel electrode 812B. The pixel electrode 812B is one of the pixel electrodes neighboring the pixel electrode 812R through which a straight line that passes through the center of microlens ML at angle φ with respect to the optical axis of microlens ML passes. The B color rays then converge at a deep point in the glass substrate 811. Part of the B color rays enters part of the black matrix section 813 and part of the neighboring pixel electrodes 812R and 812G. Similarly, the G color rays enter the glass substrate 821 at incident angle [−θ] and are refracted at refraction angle [−φ]. The G color rays then enter microlens ML at incident angle [−φ] and pass through the pixel electrode 812G. The pixel electrode 812G is one of the pixel electrodes neighboring the pixel electrode 812R through which a straight line that passes through the center of microlens ML at angle [−φ] with respect to the optical axis of microlens ML passes. The G color rays then converge at a deep point in the glass substrate 811. Part of the G color rays enters part of the black matrix section 813 and part of the neighboring pixel electrodes 812R and 812B. The voltages applied to the pixel electrodes 812B, 812R and 812G change in response to the given pixel signals. Accordingly, the polarizing states of the color rays of B, R and G passing through the liquid crystal layer 83 are modulated.

The color rays of B, R and G each focusing inside the glass substrate 811 each go out of the glass substrate 811 while diffusing. The rays are then selectively transmitted through the outgoing polarizing plate (not shown) and projected onto the screen 20 by the projection lens 19. The colors are thereby synthesized. An color image is thus projected onto the screen 20.

Attention being focused on the orthogonally incident R color ray, for example, the focal point of the microlens 822 may fall on the pixel electrode 812R or the neighborhood thereof. As shown, it is preferable that the focal point is deep within the glass substrate 811. The same applies to the other rays (B and G color rays) as well. The reason that the focal point is set to deep within the glass substrate 811 is as follows.

It is difficult to increase the condensing power by reducing the focal length of the microlens 822 because of the limitation placed on the refractive index of the resin material of the microlens 822. If the condensing power of the microlens 822 is not enough, the size of the condensing spot increases and rays leaking onto the neighboring pixel electrodes increase. In this case, the space between the pixel electrode 81 and the counter electrode 82 may be increased in accordance with the focal length of the microlens 822 and the pixel electrode may be placed near the focal point where the condensing spot diameter is to be minimum. However, the color rays of B, R and G enter the microlens 822 at specific angle θ from one another. Consequently, as shown in FIG. 5, the spaces among condensing points FR, FB and FG of the color rays increase as well with an increase in the focal length of the microlens 822. Therefore, in order to minimize light leaking into the neighboring pixel electrodes, the spaces among the pixel electrodes are required to be significantly increased and the size of the liquid crystal panel 18 is therefore enlarged.

In contrast, if incident angle difference θ of the B, R and G color rays incident on the microlens 822 is set to a small value, the spaces among condensing points FR, FB and FG are reduced although the focal length of the microlens 822 is long. It is therefore not necessary to increase the spaces among the pixel electrodes. However, each of the B, R and G color ray bundles is not a completely parallel ray bundle but includes rays having a dispersion angle (that is, the incident divergence angle α in FIG. 5) is determined by the stop size in the optical projection system (the cross-sectional area of the end face of the glass rod integrator from which light goes out in the example shown in FIG. 3). Consequently, if incident angle difference θ is set to a small value, separation of the B, R and G color rays is incomplete. In this case, the amount of light leaking into the neighboring pixel electrodes increases instead and color purity is reduced.

For this reason, the distance between the pixel electrode and the microlens 822 is required to be reduced as the demand for reducing the size and achieving higher definition of the liquid crystal panel 18 increases. Therefore, the distance between the pixel substrate 81 and the counter substrate 82 is set to shorter than the focal length of the microlens 822 and the focal point of the microlens 822 is deep within the glass substrate 811 of the pixel substrate 81.

The functions specific to the projection-type liquid crystal display apparatus will now be described.

As described above, the major portion of the orthogonally incident R color rays enters the pixel electrode 812R and is thereby transmitted. Part of the R color rays enters part of the black matrix section 813 and part of the neighboring pixel electrodes 812B and 812G. Since the trimming filters 814B and 814G are provided on the pixel electrodes 812B and 812G, each in correspondence with the respective pixel electrodes, the filters absorb the R color rays and prevent transmission of the R color rays through the pixel electrodes 812B and 812G. As a result, color mixture, that is, the R color is mixed into the B and G colors, is prevented. Since the quantity of the R color ray absorbed by the trimming filters 814B and 814G is 1 to 2 percent of the incident R color ray, the heat thereby generated causes no serious problem. Although the major portion of the R color ray is transmitted through the trimming filter 814R provided on the pixel electrode 812R, it is possible to set the transmissivity thereof to as high a value as possible. The heat thereby generated causes no serious problem, either.

The major portion of the B color rays incident at angle θ enters the pixel electrode 812B. Part of the B color rays enters part of the black matrix section 813 and part of the neighboring pixel electrodes 812R and 812G. The major portion of the G color rays incident at angle [−θ] enters the pixel electrode 812G. Part of the G color rays enters part of the black matrix section 813 and part of the neighboring pixel electrodes 812R and 812B. In these cases, too, the trimming filters 814B and 814G each formed on the pixel electrodes 812B and 812G, respectively, function in a manner similar to that in the case described above and prevent color mixture. The heat generated by light absorption causes no problem, either.

Figure 6:
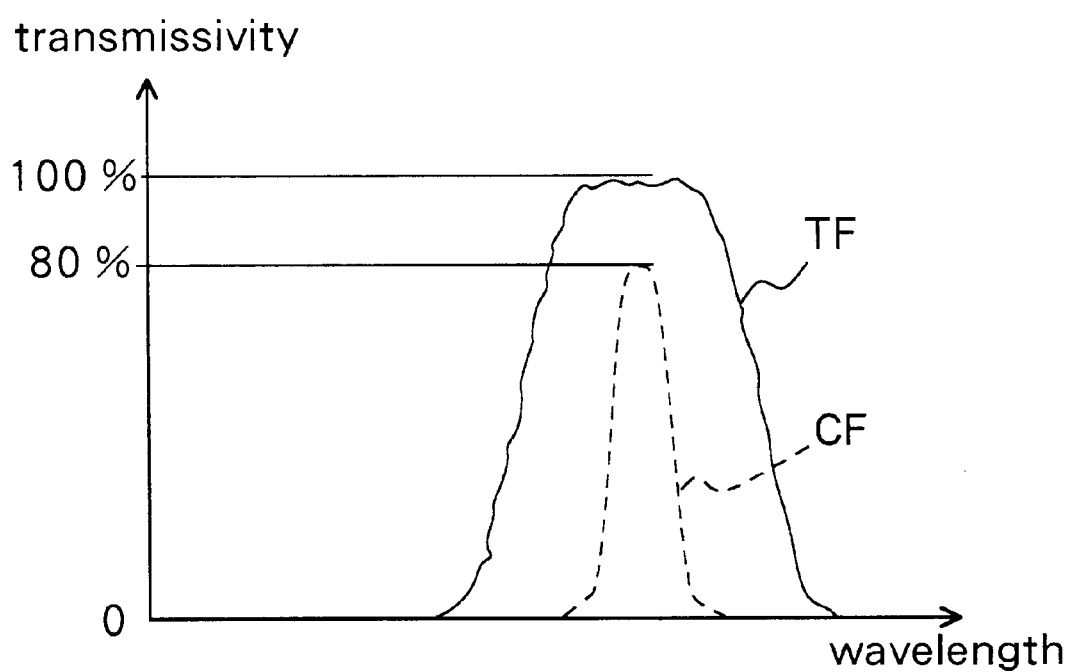
FIG. 6 is a plot for showing an example of the spectral transmission characteristic of a trimming filter used for the liquid crystal panel.

FIG. 6 shows an example of the spectral transmissivity characteristic of the trimming filter 814R. The horizontal axis indicates the wavelength of light and the vertical axis indicates the transmissivity. Solid line TF indicates the spectral transmission curve of the trimming filter 814R. Broken line CF indicates the spectral transmission curve of a color filter for selecting the R color used for the single liquid crystal panel with a color filter of the related art. As shown, the transmission wavelength band width of the trimming filter 814R is allowed to be wider than that of the color filter used for the single liquid crystal panel of the related art. The reason is as follows.

The color filter used for the single liquid crystal panel of the related art is provided for selecting light of specific wavelength (the R color rays in this example) out of white light including light of a number of wavelengths. It is therefore required to minimize the transmission band width. In this case, it is difficult to have the peak transmissivity reach 100 percent. Generally, the transmissivity remains around 80 percent. In contrast, the trimming filter 814R of the embodiment of the invention only has a function of intercepting a small part of the B and G color rays already separated by the dichroic mirrors 16B and 16G (FIG. 3) and approaching the neighboring pixel electrodes 812B and 812G that leaks onto the pixel electrode 812R. As far as the R color ray is concerned, the trimming filter 814R is only required to transmit the incident R color ray already separated by the dichroic mirror 16R. Therefore, it is not necessary to enhance the wavelength selectivity. As shown in FIG. 6, however, it is preferable that the transmissivity of the trimming filter 814R is as close to 100 percent as possible for maximizing the efficiency of utilizing light.

For the similar reason, the transmission wavelength band width of the other trimming filters 814B and 814G may be wider than that of the color filter used for the single liquid crystal panel of the related art. As a result, manufacturing the trimming filters is easier than the narrow band filter of the related art.

According to the embodiment described so far, the microlenses 822 each provided for every three pixel electrodes 812B, 812R and 812G condense the color rays of B, R and G incident at mutually different angles and have the rays enter the pixels of the respective colors. The trimming filters 814B, 814R and 814G are each provided on their pixel electrodes 812B, 812R and 812G, respectively, for intercepting rays leaking onto the own pixel electrode of the color rays to enter the neighboring pixel electrodes. As a result, a reduction in color purity due to color mixture is prevented although the incident divergence angles of the color rays entering the liquid crystal panel 18 are large. The large incident divergence angles mean that the amount of diaphragming in the optical projection system may be reduced. As a result, a reduction in color purity due to color mixture hardly occurs although the amount of light incident on the liquid crystal panel 18 is increased. That is, the luminance of an image projected onto the screen 20 is enhanced while color purity is maintained.

[Second Embodiment]

A second embodiment of the invention will now be described.

Figure 7:
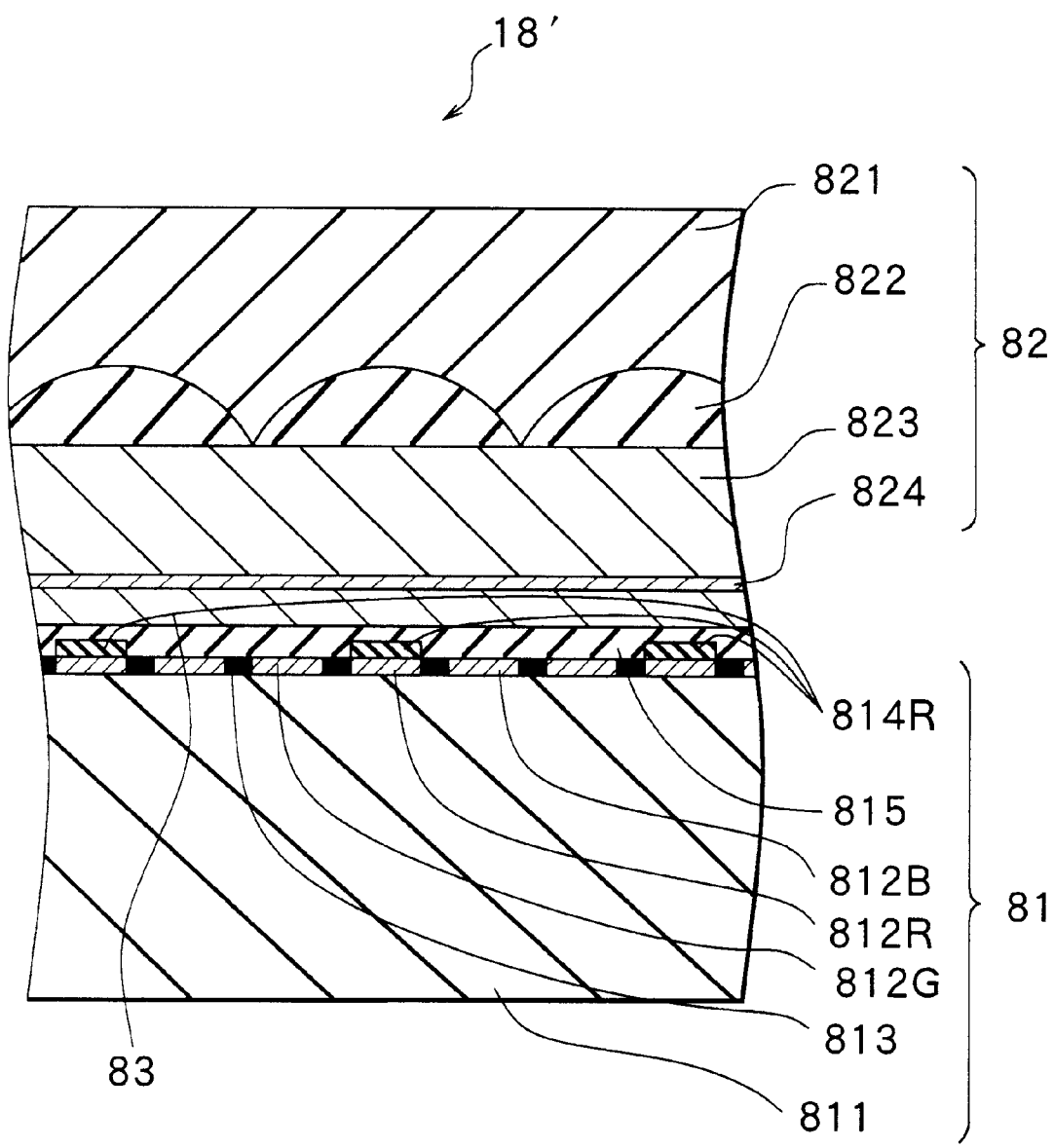
FIG. 7 is an enlarged cross section of the main part of the liquid crystal panel used for a projection-type liquid crystal display apparatus of another embodiment of the invention.

FIG. 7 is an enlarged cross section of a liquid crystal panel 18' used for a projection-type liquid crystal display apparatus of a second embodiment of the invention taken along the horizontal direction. Like numerals are assigned to components similar to those of the first embodiment (FIG. 4) and descriptions thereof are omitted if appropriate.

In the second embodiment, trimming filters are not provided on the pixel electrodes for every color of B, R and G as in the first embodiment, but trimming filters are only provided on the pixel electrodes corresponding to a spectral color whose color purity degradation due to color mixture is greatest of the spectrum of light emitted by the light source 11 (FIG. 3). To be specific, when a metal-halide lamp is used as the light source 11 as described above, for example, the spectrum thereof does not include any bright line spectrum of the red region and the intensity of the R color ray is weaker than those of the B and G color rays. Consequently, a reduction in color purity of the R color is increased due to the B and G color rays leaking onto the pixel electrodes 812R for the R color. Therefore, in the second embodiment, the trimming filters 814R are provided only on the pixel electrodes 812R for the R color, as shown in FIG. 7, for selectively preventing a reduction in color purity of the R color whose color purity degradation due to color mixture is greatest. The remainder of the configuration is similar to that of the foregoing first embodiment (FIG. 3 and FIG. 4).

Figure 8:
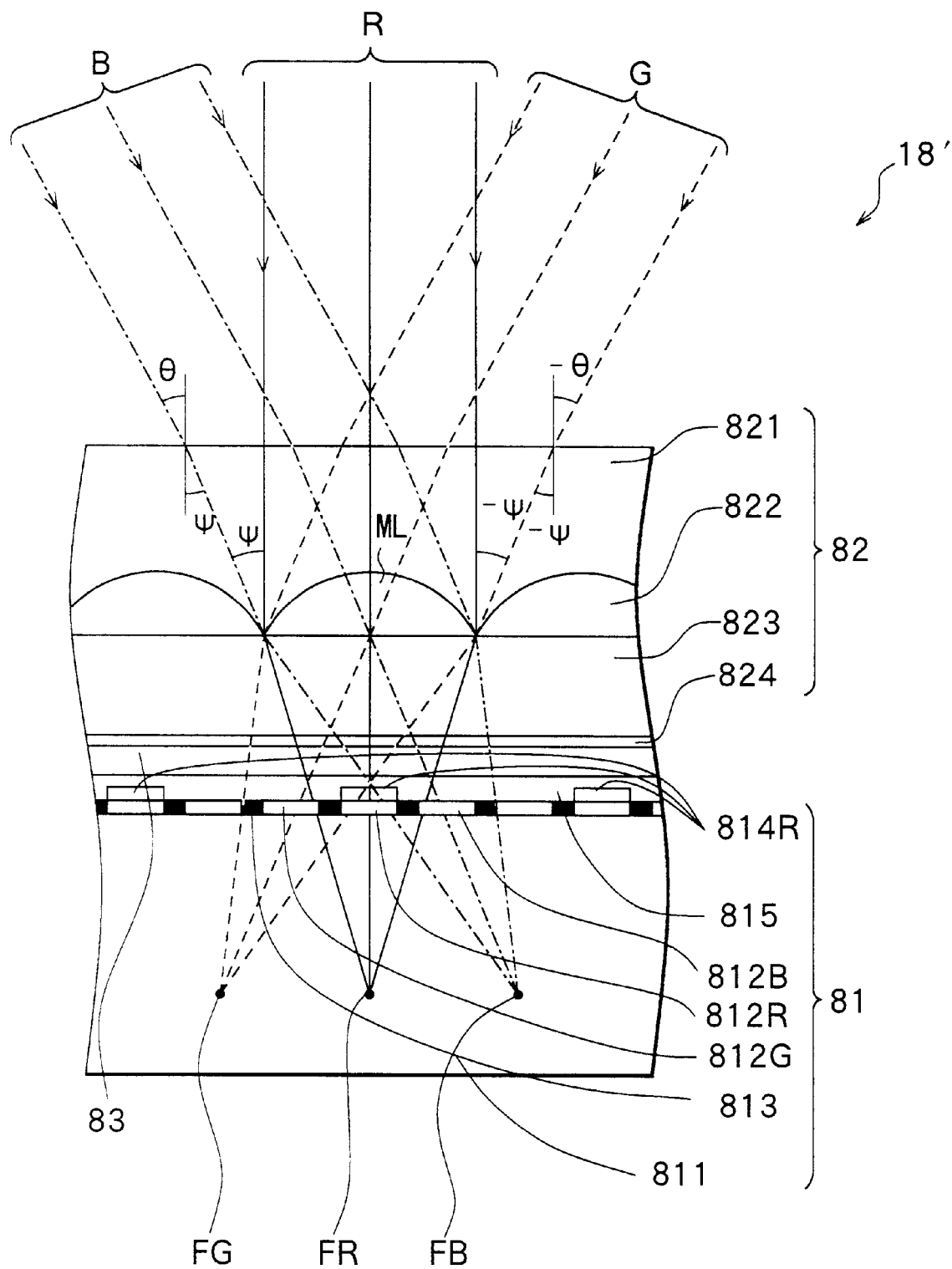
FIG. 8 is an explanatory view for illustrating the function of the liquid crystal panel.

FIG. 8 illustrates optical paths of color rays of R, B and G entering the liquid crystal panel shown in FIG. 7. Like numerals are assigned to components similar to those shown in FIG. 5 and descriptions thereof are omitted. As in FIG. 5, the solid line indicates the R color ray, the alternate short and long dash line indicates the B color ray and the broken line indicates the G color ray.

As shown, the R color rays orthogonally incident on the liquid crystal panel 18' are condensed by the microlens 822 (ML) and transmitted through the trimming filter 814R and the pixel electrode 812R and focus inside the glass substrate 811. Part of the R color rays enters the neighboring pixel electrodes 812B and 812G and is thereby transmitted. However, since the intensity of the R color ray is lower than those of the B and G color rays, the effect of the R color rays leaking onto the neighboring pixels on the chromaticity variation of the B and G color rays is small and a reduction in color purity of the B and G color rays is small. On the other hand, the B color rays incident at angle θ are condensed by the microlens 822 (ML). The greater part of the rays is transmitted through the pixel electrode 812B and focuses inside the glass substrate 811. Part of the B color rays leaks onto the neighboring pixel electrode 812R but the trimming filter 814R provided on the pixel electrode 812R absorbs the ray. The same applies to the G color rays. That is, part of the G color rays leaks onto the neighboring pixel electrode 812R but the trimming filter 814R provided on the pixel electrode 812R absorbs the ray. Mixture of the two colors into the R color is thus strictly limited and purity of the R color is maintained.

According to the embodiment described so far, the trimming filters 814R are only provided on the pixel electrodes 812R whose color purity degradation due to color mixture is greatest of the three colors of R, G and B. Compared to the foregoing first embodiment, the manufacturing steps of the liquid crystal panel are therefore simplified. Since the trimming filters 814B and 814G are not provided on the pixel electrodes 812B and 812G for the B and G colors in the second embodiment, a loss in light quantity due to the trimming filters is prevented. This is because it is difficult to achieve completely 100 percent of the transmissivity of the B color ray by the trimming filter 814B and the G color ray by the trimming filter 814G although the transmissivities are maximized. A small quantity of absorption is therefore inevitable as long as the trimming filters are provided. As a result, the efficiency of utilizing the B and G color rays is improved and the luminance of a projected image is enhanced, compared to the foregoing first embodiment.

The invention is not limited to the embodiments described so far but may be practiced in still other way. For example, the invention is not limited to the second embodiment wherein a metal-halide lamp is used as the light source and the trimming filters 814R are only provided on the pixel electrodes 812R for the R color. Alternatively, the trimming filters (814B or 814G) may be only provided on the pixel electrodes for the other color (the pixel electrodes 812B or 812G) in accordance with the spectrum of a light source of any other kind. Furthermore, the trimming filters may be only provided on two of the three kinds of the pixel electrodes 812B, 812R and 812G in accordance with the spectrum of a light source.

According to the liquid crystal modulation element and the projection-type liquid crystal display apparatus of the invention, the color rays of the primary colors incident at mutually different angles are condensed by the condensing means and the rays enter the pixels of the respective colors. The filters are each provided on the sides of the pixels on which the rays are incident for intercepting rays leaking thereto of the color rays to enter the neighboring pixels. As a result, color mixture is suppressed. A reduction in color purity due to color mixture is prevented even if the incident divergency of the color rays is increased by reducing the amount of diaphragming in the optical system generating incident light and leakage of rays into the neighboring pixels occurs. Therefore, the luminance of a displayed image is enhanced while color purity is maintained.

According to the liquid crystal modulation element and the projection-type liquid crystal display apparatus of the invention, the filters may be provided only for the pixels corresponding to part of the primary colors. The manufacturing steps of the liquid crystal modulation element may be thus simplified.

According to the liquid crystal modulation element and the projection-type liquid crystal display apparatus of the invention, the filters may be provided only for the pixels corresponding to color rays whose color purity degradation is greatest of the color rays incident on the condensing means. Compared to the case wherein the filters are provided for every pixel, a loss in light quantity due to the filters is reduced. As a result, the luminance of a projected image is further enhanced by improving the efficiency of utilizing light while maintaining necessary and sufficient color purity.

Obviously many modifications and variations of the present invention are possible in the light of the above teachings. It is therefore to be understood that within the scope of the appended claims the invention may be practiced otherwise than as specifically described.

What is claimed is:

1. A liquid crystal modulation element, comprising:
a liquid crystal layer including a liquid crystal material;
pixels grouped in correspondence with a plurality of primary colors for selectively modulating rays passing through the liquid crystal layer, each pixel corresponding to one of said plurality of primary colors;
condensing means provided for every group of pixels for condensing color rays of the primary colors incident at angles different from one another and for directing the color rays to enter the pixels of corresponding primary colors; and
intercepting filters, each intercepting filter being associated with only one of said pixels and formed on a side of the pixel on which the rays are incident, wherein each intercepting filter intercepts color rays leaking onto its associated pixel if the leaking color rays do not correspond to the primary color of its associated pixel.

2. A liquid crystal modulation element according to claim 1, wherein the intercepting filters are provided for pixels corresponding to one of said plurality of primary colors.

3. A liquid crystal modulation element according to claim 2, wherein the intercepting filters are provided only for the pixels corresponding to color rays whose color purity degradation is greatest out of the color rays incident on the condensing means.

4. A projection-type liquid crystal display apparatus, comprising:

a color separation means for separating incident light into rays of a plurality of primary colors and sending out the color rays at angles different from one another;

a liquid crystal modulation element including:
a liquid crystal layer including a liquid crystal material;
pixels grouped in correspondence with the primary colors for selectively modulating rays passing through the liquid crystal layer, each pixel corresponding to one of said plurality of primary colors;
condensing means provided for every group of pixels for condensing color rays of the primary colors incident from the color separation means at angles different from one another and for directing the color rays to enter the pixels of corresponding primary colors; and intercepting filters, each intercepting filter being associated with only one of said pixels and formed on a side of the pixel on which the rays are incident, wherein each intercepting filter intercepts color rays leaking onto its associated pixel if the leaking color rays do not correspond to the primary color of its associated pixel; and means for combining the color rays sent out from the liquid crystal modulation element and for forming an image.

5. A projection-type liquid crystal display apparatus according to claim 4, wherein the intercepting filters are provided for pixels corresponding to one of said plurality of primary colors.

6. A projection-type liquid crystal display apparatus according to claim 5, wherein the intercepting filters are provided only for the pixels corresponding to color rays whose color purity degradation is greatest out of the color rays incident on the condensing means.

* * * * *